No. 635,455. Patented Oct. 24, 1899.
F. L. WHITE.
CALCIUM CARBID CARTRIDGE.
(Application filed June 20, 1898.)
(No Model.)
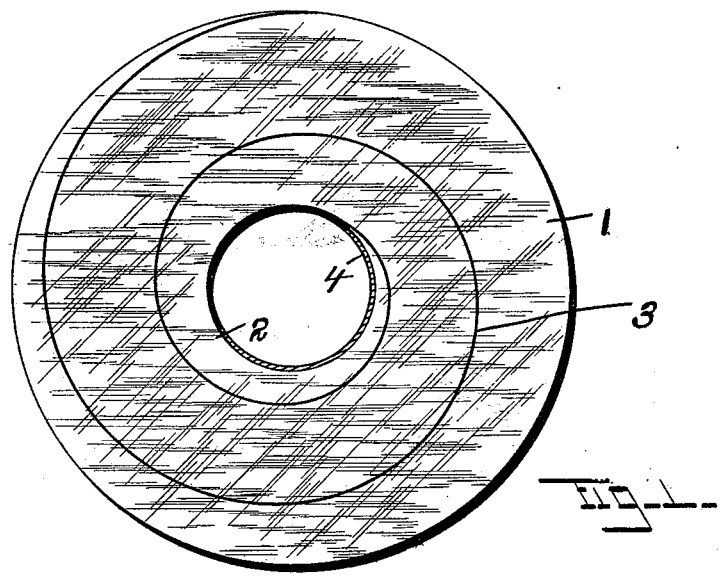
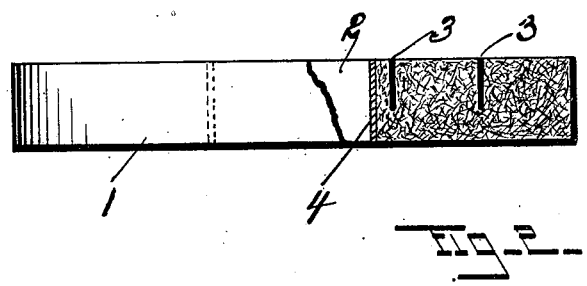
Witnesses.
W. B. Prichard
H. E. Clark
Inventor.
Frederick L. White
by
Chapman and Hall
Attorneys

UNITED STATES PATENT OFFICE.

FREDERICK L. WHITE, OF WATERBURY, CONNECTICUT, ASSIGNOR TO GEORGE H. CLOWES, OF SAME PLACE.

CALCIUM-CARBID CARTRIDGE.

SPECIFICATION forming part of Letters Patent No. 635,455, dated October 24, 1899.

Application filed June 20, 1898. Serial No. 683,953. (No specimens.)

*To all whom it may concern:*

Be it known that I, FREDERICK L. WHITE, a citizen of the United States, residing at Waterbury, in the county of New Haven and State of Connecticut, have invented certain new and useful Improvements in Cakes of Calcium Carbid, of which the following is a specification, reference being had therein to the accompanying drawings.

My invention comprises as a new article of manufacture a cake of calcium carbid, with means for distributing water or other liquid throughout the same.

The object of my invention is to distribute water or other liquid equally to all parts of a cake of calcium carbid; and to this end my invention consists in the cake of calcium carbid having certain peculiarities of construction, as will be hereinafter described, and more particularly pointed out in the claims.

Actual practice has demonstrated that by the method now in vogue of continuously dropping water upon one portion of the cake of calcium carbid to produce acetylene gas that portion only is consumed which immediately surrounds the water-receiving portion, leaving a ring of unused carbid outside the lime residue. By this practice a considerable portion of the original cake of carbid is not consumed and is thrown away as worthless, adding greatly to the expense of generating acetylene gas and reducing materially the length of time that a cake can be used. Several methods have been derived to overcome this objection, the chief one being to present water to the cake of calcium carbid from several jets, thus distributing the water over a greater area; but this method proved defective, because more gas was produced than could be consumed. My improved means consist generally in providing a cake of calcium carbid having a central hole, with a ring of absorbent material within the said hole, and a continuous strip of absorbent material extending from the central portion thereof to its periphery, which when moist distributes the water equally to all parts of the cake without an overproduction of gas.

Referring to the drawings, in which like numerals designate like parts in both views, Figure 1 is a top view of a cake of calcium carbid embodying my invention. Fig. 2 is a fragmentary side elevation of the same.

The numeral 1 designates a circular cake of calcium carbid having a hole 2 passing transversely through its central portion. 3 designates a strip of absorbent material, preferably blotting-paper, embedded in one side of the cake, as shown in Fig. 2, which extends from the central portion to the periphery of the cake in a series of convolutions about the axis thereof, and 4 designates a circular ring of absorbent material within the hole 2.

I prefer to embed the strip 3 in one side of the cake; but it may extend completely through the same within my invention.

It is apparent that by dropping water within the hole 2, and thus moistening the ring 4, or by dropping water upon any portion of the cake of calcium carbid, as herein described, it will percolate through the carbid sufficiently to reach some portion of the strip 3, which, being of absorbent material, absorbs the water and moistens the whole strip from end to end. The moisture is thus distributed equally throughout the cake and all of the carbid is consumed, leaving nothing but the lime residue.

It is not essential that there should be a hole in the cake. Neither is the shape of the cake nor the path of the strip material to my invention, and I do not limit myself therefore to a cake of circular form or to a strip of material forming a series of convolutions about the axis thereof.

I am aware that it is old to use radial partitions within a receptacle containing loose carbid and to compress carbid into a cake. I do not therefore claim such as my invention; but What I do claim as new, and desire to secure by Letters Patent, is—

1. As a new article of manufacture, a cake of calcium carbid having a strip of absorbent material forming part thereof and extending from its central portion to its periphery in a series of convolutions, substantially as described.

2. As a new article of manufacture, a cake of calcium carbid having a strip of absorbent material embedded in one side thereof and describing a series of convolutions from the center to its periphery, substantially as described.

3. As a new article of manufacture, a cake of calcium carbid having a hole therethrough, a ring of absorbent material within the said hole and a strip of absorbent material extending from the said hole to the periphery of the said cake in a series of convolutions, substantially as described.

In testimony whereof I affix my signature in presence of two witnesses.

FREDERICK L. WHITE.

Witnesses:
    EDW. S. GOODMAN,
    GEO. E. HALL.